United States Patent
Stiles et al.

(10) Patent No.: US 11,475,173 B2
(45) Date of Patent: Oct. 18, 2022

(54) METHOD FOR REPLICATING A COMPONENT MATING IN AN ASSEMBLY

(71) Applicant: Dassault Systemes SolidWorks Corporation, Waltham, MA (US)

(72) Inventors: Jody Stiles, Northborough, MA (US); Makarand Apte, Pune (IN); Chin-Loo Lama, Bolton, MA (US); Girish Mule, Pune (IN); Shrikant Savant, Shrewsbury, MA (US)

(73) Assignee: Dassault Systémes SolidWorks Corporation, Waltham, MA (US)

( * ) Notice: Subject to any disclaimer, the term of this patent is extended or adjusted under 35 U.S.C. 154(b) by 0 days.

(21) Appl. No.: 17/139,008

(22) Filed: Dec. 31, 2020

(65) Prior Publication Data
US 2022/0207197 A1 Jun. 30, 2022

(51) Int. Cl.
*G06F 30/12* (2020.01)
*G06T 7/60* (2017.01)
*G06F 111/04* (2020.01)
*G06F 111/20* (2020.01)

(52) U.S. Cl.
CPC .......... *G06F 30/12* (2020.01); *G06T 7/60* (2013.01); *G06F 2111/04* (2020.01); *G06F 2111/20* (2020.01); *G06T 2207/20101* (2013.01)

(58) Field of Classification Search
None
See application file for complete search history.

(56) References Cited

U.S. PATENT DOCUMENTS

| | | | |
|---|---|---|---|
| 7,392,255 B1* | 6/2008 | Sholtis | G06F 16/256 |
| 2008/0059952 A1* | 3/2008 | Van Huben | G06F 16/27 |
| | | | 717/120 |
| 2014/0379309 A1* | 12/2014 | Banta | G06F 30/23 |
| | | | 703/1 |
| 2015/0293525 A1* | 10/2015 | Yamamoto | G05B 19/4097 |
| | | | 702/182 |
| 2017/0060384 A1* | 3/2017 | Baardse | G06F 3/04815 |
| 2017/0169135 A1* | 6/2017 | Kumar | G06T 7/60 |
| 2018/0268536 A1* | 9/2018 | Byers | G05B 19/4097 |
| 2021/0129221 A1* | 5/2021 | Osgood | B33Y 50/00 |

FOREIGN PATENT DOCUMENTS

| | | |
|---|---|---|
| EP | 3432172 | 1/2019 |
| WO | 2017098469 | 6/2017 |

OTHER PUBLICATIONS

European Search Report for EP21218433.7 dated May 19, 2022.

\* cited by examiner

*Primary Examiner* — Joni Hsu
(74) *Attorney, Agent, or Firm* — Sheehan Phinney Bass & Green PA

(57) ABSTRACT

A method in a computer aided drafting application for replicating a component mating in a modeled assembly includes examining constraints and geometry surrounding a selected component of the component mating in a first surface of the assembly. A first descriptor with a plurality of numerical characteristics of the constraints and geometry is captured. The first descriptor is set as a first seed descriptor. A potential first target geometry in the region of the first face is examined and a first target descriptor is computed according to the first target geometry. If first seed descriptor matches the first target descriptor, an instance of a first target component is created according to the first target descriptor.

12 Claims, 10 Drawing Sheets

METHOD FOR REPLICATING A COMPONENT MATING IN AN ASSEMBLY

FIELD OF THE INVENTION

The present invention relates to modeling of physical systems, and more particularly, is related to simplifying repetitive processes in a modeled system.

BACKGROUND OF THE INVENTION

When creating a computer aided drafting (CAD) model of a physical assembly, the process of inserting, moving, orienting, and constraining a component can be quite repetitive and as such is subject to human error at every step of the process. Typically, methods of repetitively placing and constraining components, for example, fasteners, require the user to provide significant selections per command such as Copy with Mates in modeling applications such as SOLIDWORKS. Similarly, a command may be limited to geometries that exist on a shared surface (face) and/or have the same geometric properties such as SOLIDWORKS Smart Fasteners. Variations from the same face or geometry require the user to manually replicate the placement and constraint of another instance of the component before the mate can be replicated through the aforementioned processes.

FIG. 1A shows a schematic diagram of a modeled assembly 100 including a plurality of plates 110, 140, 150, 160, 170. A components table (not shown) for the assembly 100 includes each of the plates 110, 140, 150, 160, 170. A first plate 115 includes clearance holes 120, 125 where one or more fastener components 130 (nut, bolt, washer, etc.) may be used to attach the first plate 110 to plates 140, 150, 160. For example, a user creates a fastener component 130 (a bolt, in this case) for fastening the first plate 110 to a second plate 160 by inserting the fastener component 130 through a clearance hole 120 at a top face 115 of the first plate to be received by a threaded hole in the second plate 160 to receive the threads of the fastening component 130. The user adds the fastener component 130 to the components table. As shown by FIG. 1B, the user defines a mate 135 including the fastener component 130 and the clearance hole 120. These components and their dimensions are stored in a descriptor table, which both describe the individual components 120 and 130 of the mate 135 and their relationships with each other.

Once the first mate 135 has been manually defined by the user, replicating this mate 135 in other locations in the assembly (for example, in the other clearance holes 120, 125 in the surface 115 of the first plate 110) requires the user to manually define every location and mating constraint or have the same geometry existing in each desired location. Such manual mating may be tedious since selection of each face may involve rotating and/or zooming the view of the model to allow the user to see and select the part, and such manipulation may be needed for every face selection. The identification of similar sized geometry on a given face can be quite difficult for the human eye often requiring the user to implement other means such as measurement tools or trial and error to determine if the selected geometry is appropriate. Therefore, there is a need in the industry to address one or more of the abovementioned shortcomings.

SUMMARY OF THE INVENTION

Embodiments of the present invention allow a user of a CAD system to replicate the placement and constraint of a component of interest of a modeled assembly with minimal user input. The process takes as an input one instance of the component to be partially or fully constrained to some geometry. The user invokes a process to automatically replicate the placement and constraint of the component of interest. The process analyzes the component of interest, the constraints between it and other components, and the geometry adjacent to and in the region of the component of interest. System has performed this analysis, the face on which the component is constrained and is analyzed to determine if other geometry on and adjacent to and/or in the region of the face is similar to the component of interest and its adjacent and regional geometry. If the system finds similar geometry, the system presents the user with a visual indicator of where the similar geometry is. The user may then choose to have the process automatically replicate the component of interest and its constraints in that location or exclude the suggestion and not replicate the component in that location. The process allows the user to select additional geometry on the same or other model faces in order to replicate the component placement and constraint on those faces using the same analysis as previously described. Additionally, user may use the process to find geometry that is more similar or less similar to the geometry adjacent to and in the region of the component of interest.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1A:
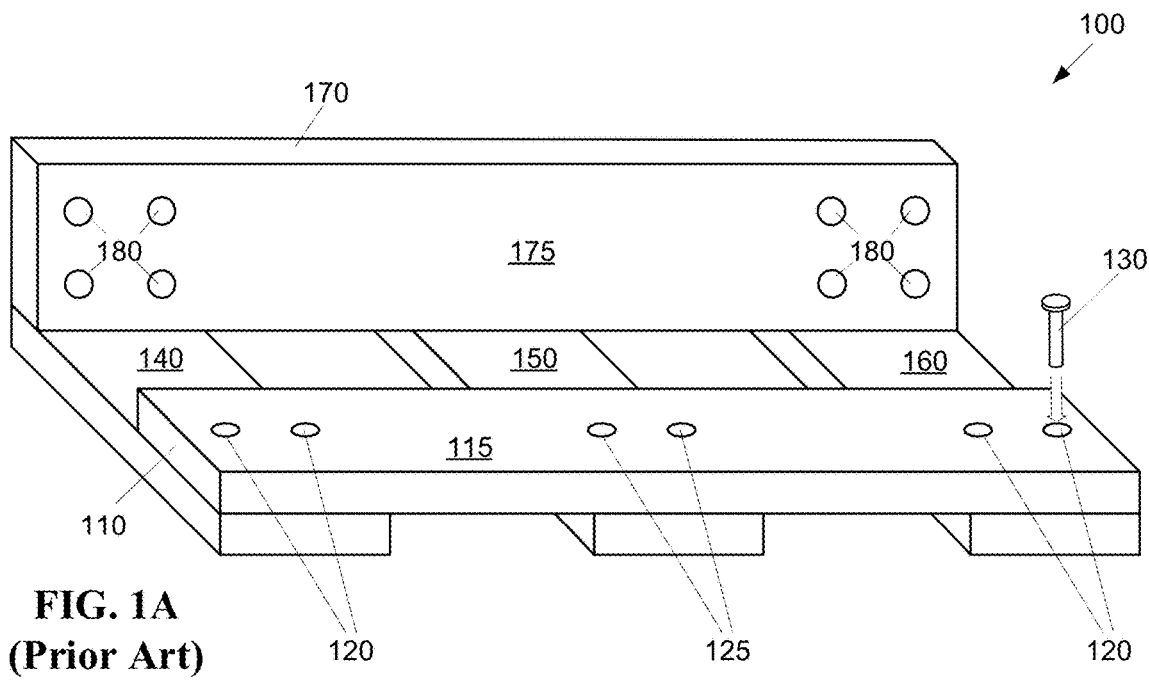
FIG. 1A is a schematic diagram of an exemplary first modeled assembly.

The following definitions are useful for interpreting terms applied to features of the embodiments disclosed herein, and are meant only to define elements within the disclosure.

As used within this disclosure, a "revolute mate" refers to a coincident mate and concentric mate that are applied simultaneously. A coincident mate is a mate that forces two planar faces to become coplanar. A concentric mate forces two cylindrical or conical faces to become coaxial.

As used within this disclosure, a "descriptor" refers to a data structure describing the properties of a local region of geometry within the modeled assembly. A descriptor may include both text fields and numerical fields, as well as fields indicating relationships with other components and/or structural features. This usage of the term 'descriptor' is common in information retrieval systems. For example, in image retrieval system, descriptors contain the visual features of images such as shape, color or texture that help classify images. In a music search system, a descriptor may contain properties such as rhythm, scale, genre, artists etc. In a document retrieval system, a descriptor may contain the counts of individual words, author, language etc.

As used within this disclosure, a "component list" refers to a listing of individual parts of a two dimensional (2D) or three dimensional (3D) modeled assembly. In a CAD environment, a component list may be presented visually as a side-bar to a graphical window presenting a 2D or 3D rendering of the modeled assembly. The component list and the graphical window may be interactive, for example, selecting a component in the component list may highlight the corresponding component in the graphical window, and likewise selecting a component in the graphical window (for example, via a mouse click) may highlight the corresponding component in the component list.

As used within this disclosure, "model resolution" refers to a parameter of CAD system that indicates a minimum dimension, such that anything smaller than the model resolution is considered as zero length by the CAD system.

As used within this disclosure, a "seed mate" refers to the combination of a concentric and a coincident relationship created between a first component in a 2D or 3D assembly to be replicated and a second component, for example, a revolute mate between a fastening component and a receiving component having an axial bore.

As used within this disclosure, "unconstrained motion" and "unconstrained mode" refer to a condition where a part within a finite element model is free to move in a certain direction without restriction.

As used within this disclosure, a "face" refers to a surface of a part of a 2D or 3D modeled assembly.

Reference will now be made in detail to embodiments of the present invention, examples of which are illustrated in the accompanying drawings. Wherever possible, the same reference numbers are used in the drawings and the description to refer to the same or like parts.

As noted in the Background section, present CAD solutions require manual repetition of mating similar components that may result in wasted time and unnecessary errors. Exemplary embodiments of the present invention (referred to herein as the "mate helper") analyze a selected component of an identified mating and its adjacent and regional geometry, so the user no longer has to determine the appropriate geometry elsewhere in the model by visual identification and allowing the user to remove unwanted suggestions or customize the results to fit their needs. The embodiments remove the specter of human error by replicating the constraints from the components of interest in each of the suggested locations.

Figure 1B:
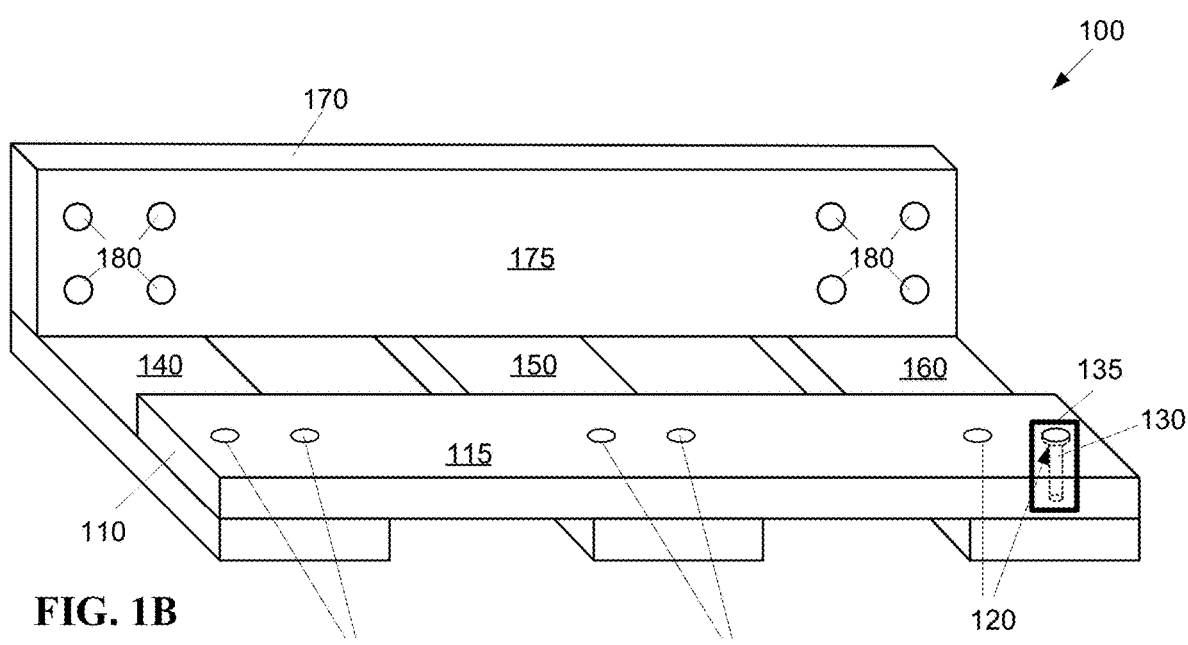
FIG. 1B is a schematic diagram of the modeled assembly of FIG. 1A showing a first user defined mate in a first surface.
Figure 2A:
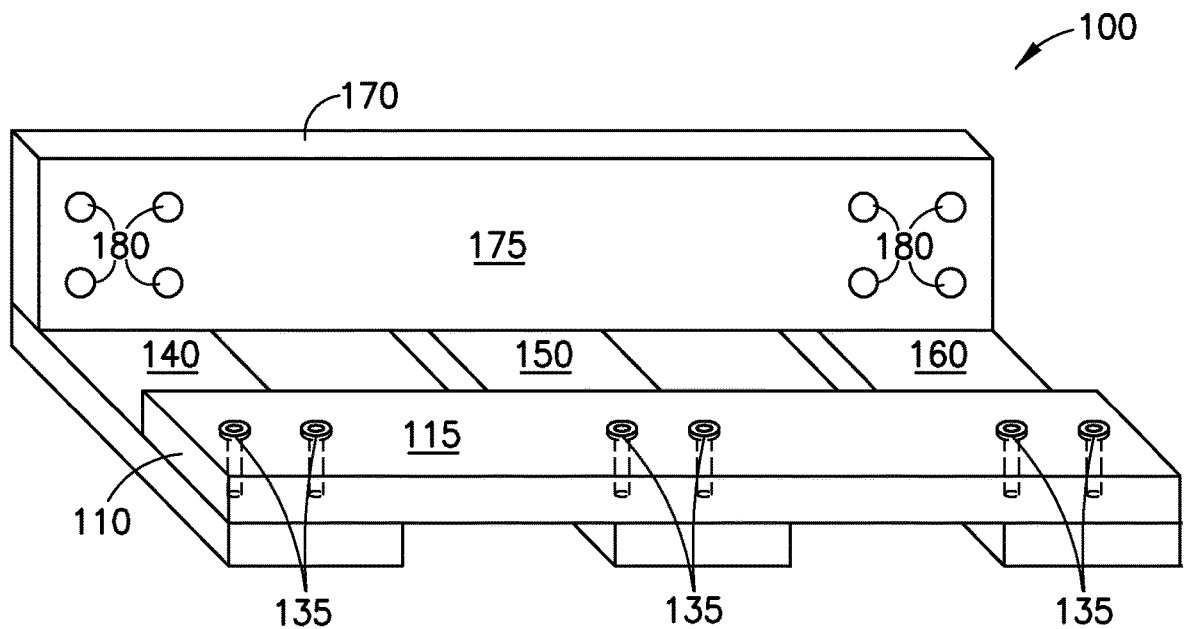
FIG. 2A is a schematic diagram of the modeled assembly under an exemplary first embodiment showing a plurality of suggested mates based upon the user selected mating of FIG. 1B.

Referring back to FIG. 1B, once the first mate 135 has been manually defined by the user, the user indicates the user's wishes to replicate usage of this fastener 130 in multiple receiving locations on the first mating face 115, and the first embodiment of the present invention identifies and presents suggestions for other potential mates 135 in the first surface 115, as shown by FIG. 2A.

Figure 2B:
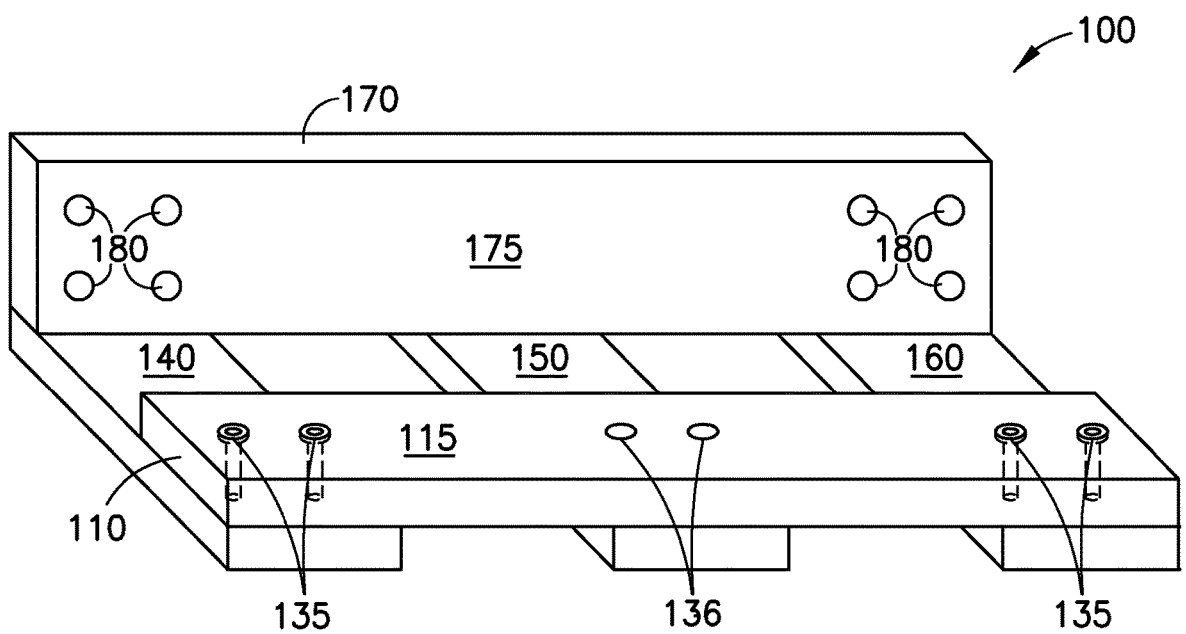
FIG. 2B is a schematic diagram of the modeled assembly of FIG. 2A showing deselection of suggested mates.
Figure 2C:
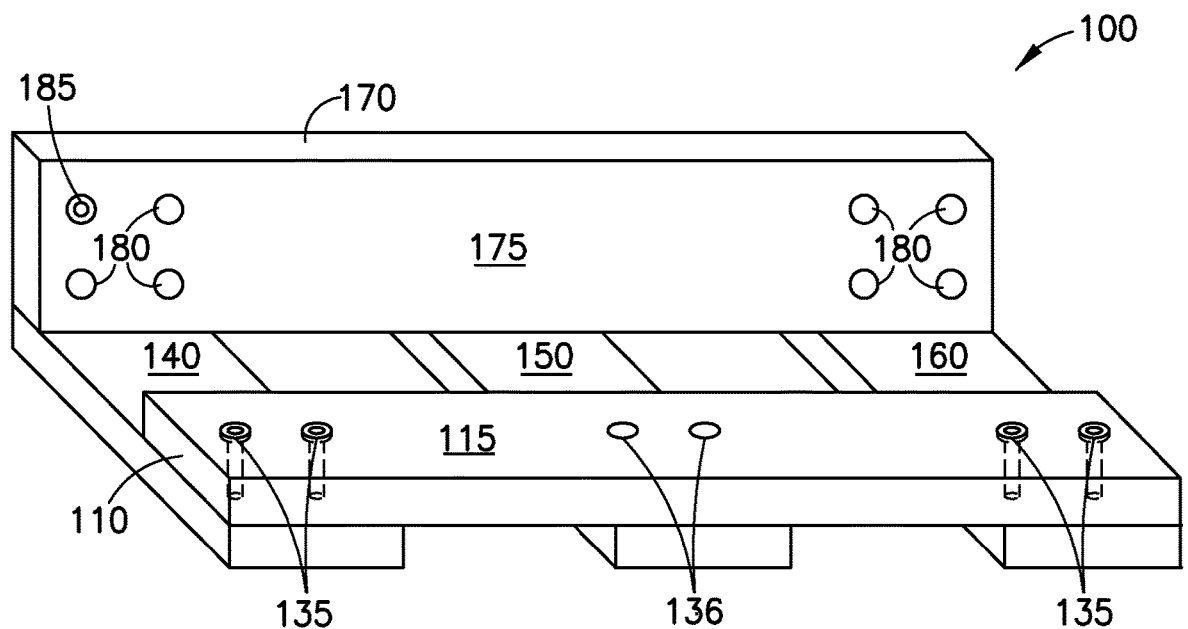
FIG. 2C is a schematic diagram of the modeled assembly of FIG. 2A showing a selection of an additional mate on a second surface.
Figure 2D:
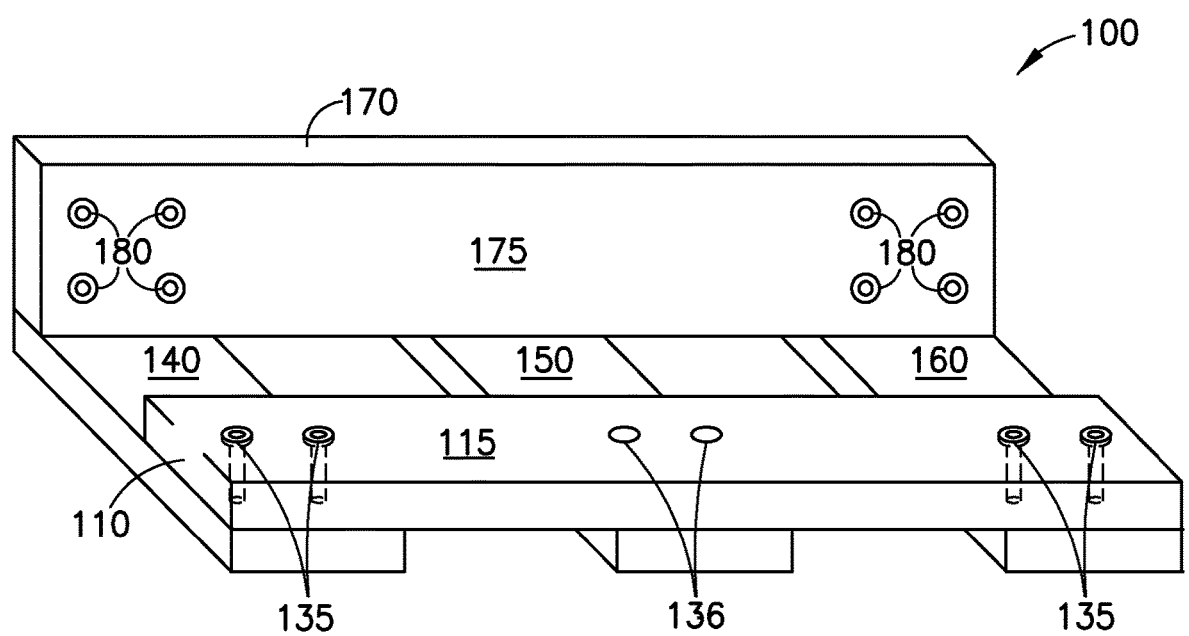
FIG. 2D is a schematic diagram of the modeled assembly of FIG. 2C showing a plurality of suggested mates in the second surface based upon the additional mate.

The user may selectively keep or reject the selections 135. For example, as shown in FIG. 2B, the user may choose to deselect holes 136 from the first face 115, as described further below. As shown in FIG. 2C, the user may then select a second mate 185 in a second surface 175, where the mate helper searches for and identifies mating scenarios matching search criteria for mates on the first mating surface, as shown by FIG. 2D. When choosing the second mating surface 175, the user may expand the mate search, for example, changing the size of a component (for example the fastener diameter, fastener depth). The mate helper not only looks for similar structures for receiving a fastener (e.g., a bolt hole), but also creates the associated mates (fastener (e.g., bolt)) by replicating the seed mate 135, 185, and adds the created mate components to the component list.

Figure 3:
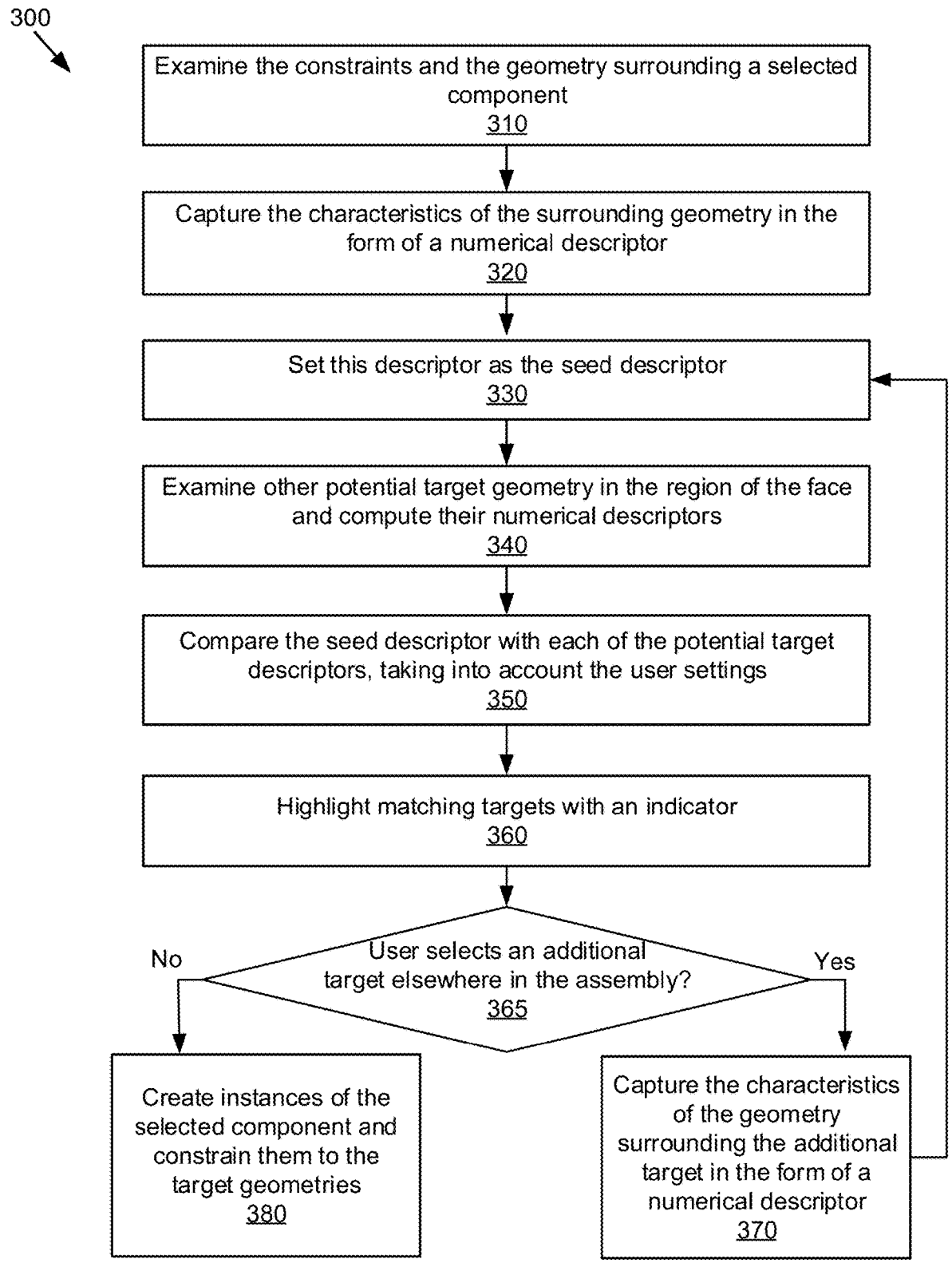
FIG. 3 is a flowchart of an exemplary embodiment of a method for suggesting mates based upon a user defined first mate.

FIG. 3 is a flowchart of an exemplary method for replicating mates in a model. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A first mate 135 (FIG. 1B) is created by a user of the CAD system. The first mate includes a selected component 130 (FIG. 1B) that is already constrained by one or more mates, where at least one mate involves an axis from the surrounding geometry. For example, in the case when the selected component is a bolt that is mated with a hole on a plate, the bolt is constrained by the axis of the hole. The mate is a revolute mate including a component 130 (FIG. 1A) to be replicated at a receiving portion 120 (hole) in a face 115 (FIG. 1B) of the assembly 100 (FIG. 1B). The constraints and the geometry of the receiving portion (surrounding region) 120 (FIG. 1A) for the selected component 130 (FIG. 1A) are examined, as shown by block 310. The characteristics of the surrounding geometry are captured in the form of a numerical descriptor, as shown by block 320. The numerical descriptor is set as a seed descriptor, as shown by block 330. The mate helper scans through descriptors for the entire part having the seed mate to find regions having descriptors matching the seed descriptor to display to the user.

The mate helper examines geometry 120 of other potential ("suggested") targets in the region of the face 115 and computes and their numerical descriptors, as shown by block 340. The seed descriptor is compared with each of the potential target descriptors, as shown by block 350. User preferences may be considered during the comparison, for example the mate helper may identify a target having variant ranges of one or more dimensions in the target descriptors. Suggested targets are visually indicated (as shown in yellow in FIG. 2A), as shown by block 360. For example, the visual indicator may be in the form of colored concentric circles. Under the first embodiment, the user may deselect a suggested target by clicking on the innermost concentric circle. The mate helper hides the innermost circle from the visual indicator of the deselected suggestions 136 (FIG. 2C).

Instances of the suggested components are created and constrained according to the target geometries, as shown by block 380. For example, if a target geometry has the same axial bore diameter as the seed descriptor, but a shallower depth, the instance of the suggested component may be constrained to a shorter length than the seed component corresponding to the shallower depth of the target geometry. As another example, if a target geometry has the same axial bore depth as the seed descriptor, but a wider diameter, the instance of the suggested component may be constrained to a wider diameter than the seed component corresponding to the wider diameter of the target geometry.

In a scenario with a single seed mate, the suggested seeds may match the seed on all properties within the model resolution. For example, if the radius of the seed hole is r, the allowed radius range for the suggestions may be [r−res, r+res], where res is the model resolution. When the user makes one or more additional selections, the mate helper adjusts the allowed ranges for each property based on its value in the original seed and the additional seeds. For example, if the radius of the first seed hole is r1 and the radius of the additional seed is r2, with r2 larger than r1, the suggested mates may thereafter include holes with a radius range of [r1−res, r2+res]. In general, for every descriptor property, the embodiments may allow a range of [smallestOf (t1, t2, . . . )−res, largestOf(t1, t2, . . . )+res], where t1, t2, . . . are the values of that property on the user given seeds. This automatically improves the range of values matched for that parameter.

In an alternative embodiment, the mate helper may deduce from additional user selections which parameters are less important to the user, so more variance is permitted on those parameters when searching for mate suggestions. For example, if the second selection is a hole of a different depth from the first selection, the system may expand the search criteria based on the assumption that the depth of the hole is not critical to the match, and the depth range may be relaxed or even ignored.

The created instances are added to a component table. The user may select an additional target 185 (FIG. 2C) elsewhere in the assembly 100 (FIG. 2C), for example, a through-hole 180 (FIG. 2C) on a second surface 175 (FIG. 2C) of the assembly 100 (FIG. 2C). The characteristics of the geometry surrounding the additional target 185 are captured in the form of a numerical descriptor, as shown by block 370. Additional suggestions based on the additional target 185 may be generated, as shown by FIG. 2D.

For a component with an axial component, such as the extending shaft of a bolt, examining the constraints and the geometry of the receiving portion surrounding the selected component involves identifying all faces surrounding the selected component 130 (FIG. 1B). For every face in the surrounding vicinity of the selected component 130, a descriptor is created to capture the geometry face type, the face orientation, characteristics of the face with respect to the axis of the selected component. The face type may be, for example, planar, cylindrical, etc. The descriptor includes a field indicating whether a given face is convex, concave, or planar. For faces with an axial geometry (cylindrical, conical, etc.), the descriptor captures any radius variation along the axis. For example, if the face is conical, the descriptor records a first radius at a first end and a second radius at a second end. Along with the first radius and the second radius, the descriptor also records an axis parameter (described below) of the first end and the axis parameter of the second end of the cone. In contrast, a cylindrical face has a constant radius. If the face has a more complex axial geometry (for example, toroidal faces, or revolved faces), the radius variations may be sampled at points between the start and the end radius. If the face of the receiving component has a non-axial geometry (planar, spline etc.), the descriptor may only include a minimum distance between the axis and the face.

If one or more additional axes are involved in the mate, for each axis a descriptor is created to capture the minimum distance of that axis from the primary axis and the parameter of the point the primary axis which is at the minimum distance from the additional axis.

After creating the descriptors, the mate helper sorts the descriptors by an ascending order of the axis parameter values. The axis parameter values are normalized, for example, by subtracting the first axis parameter value from all other axis parameter values, so that the first axis parameter is set to zero and others parameter values remain at the same relative position from the first.

As described in further detail below, the descriptors contain properties of the faces in the region around a given axis. More properties such as face perimeter, face area, the number of edges in the face, etc. may be optionally included if a stricter similarity between the seed region and the target regions is desired. The full contents of the descriptor are illustrated with the help of an example shown by FIGS. 4-8.

Figure 4:
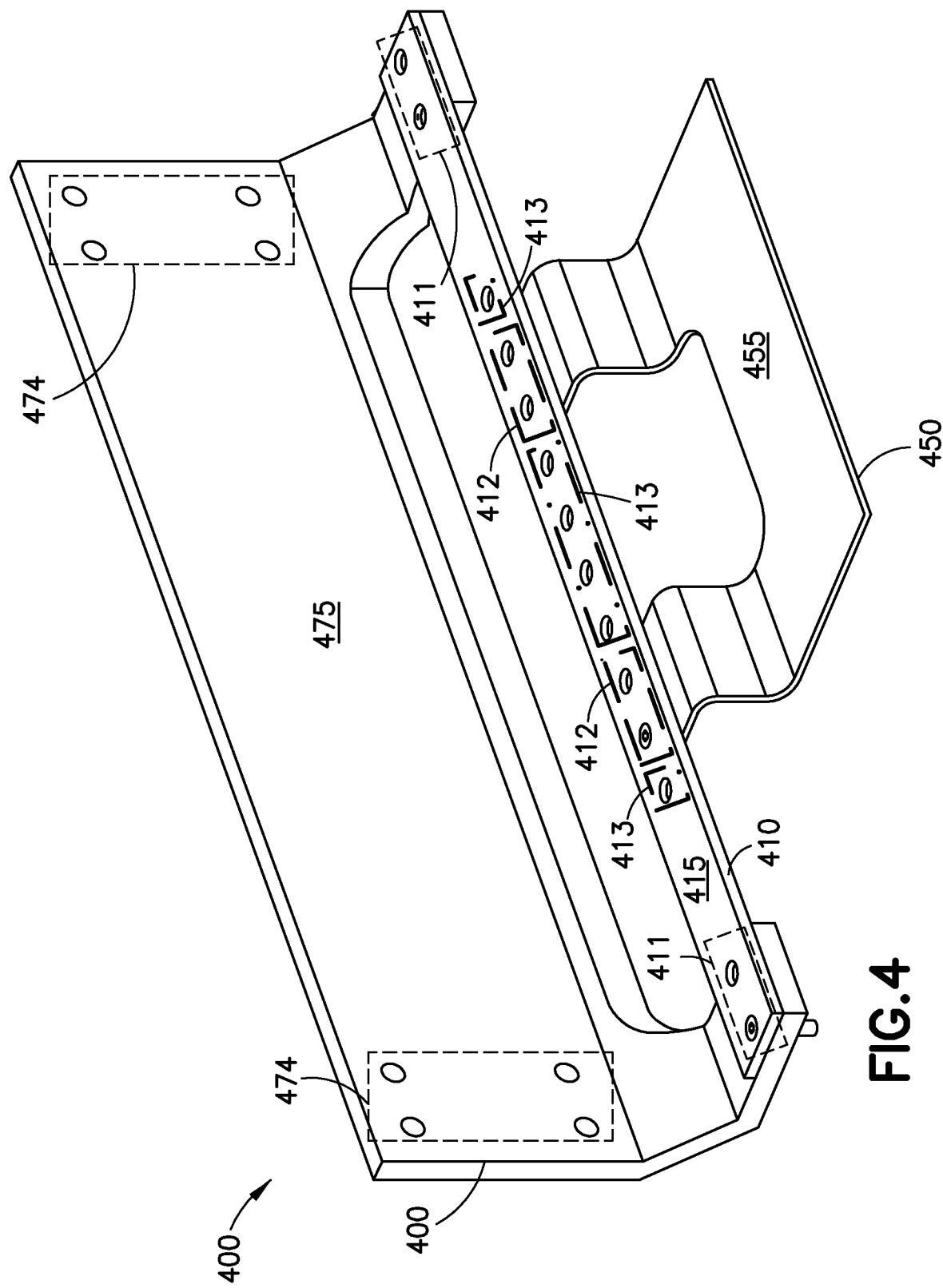
FIG. 4 is a schematic diagram of a second exemplary modeled assembly.

FIG. 4 is a schematic diagram of an exemplary assembly 400 including a first part 410 with a first part first face 415. A first group of holes 411 (shown surrounded by a dotted box), a second group of holes 412 (surrounded by a dashed box), and a third group of holes 413 (surrounded by a dash-dot box) pass through the first part 410 at the first face 415. A second part 450 has a second part first face 455. A third part 470 has a third part first face 475. A fourth group of holes 474 (surrounded by a dashed box), pass through the third part 470 at the first face 475.

In this example, descriptors for each of the hole groups 411-414 show the differences between the holes of the four groups 411-414 based on the geometry surrounding the hole axis of each respective hole group 411-411. Holes with identical descriptors are included in a single group. The contents of the descriptor in this example are shown in Tables 1-4.

Figure 5A:
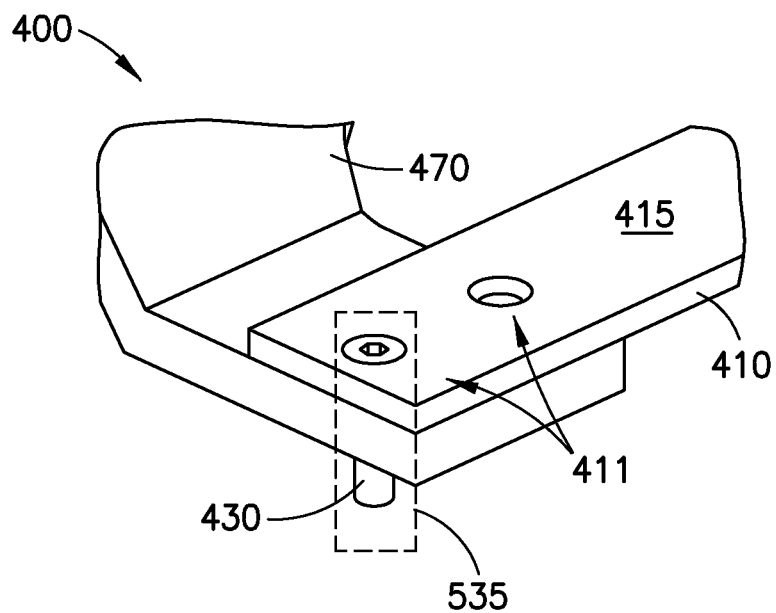
FIG. 5A is a detail of the assembly of FIG. 4 showing a first hole group.
Figure 5B:
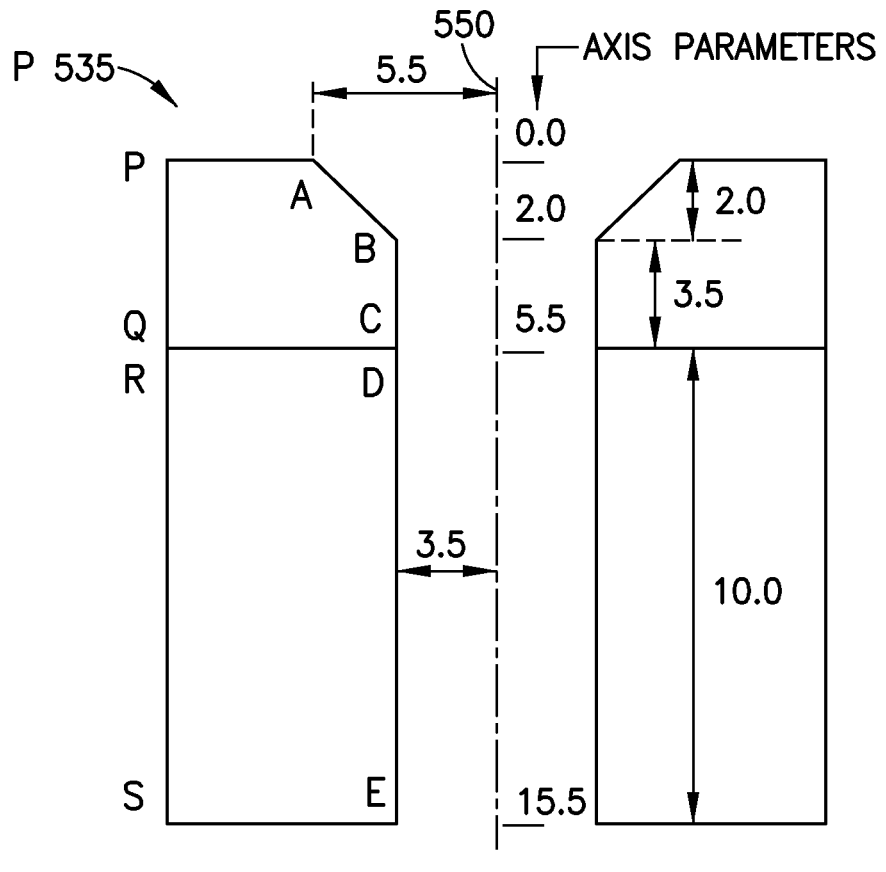
FIG. 5B is a cutaway diagram showing characteristics of the first hole group of FIG. 5A.

FIG. 5A is a first detail of the assembly of FIG. 4 showing an outline of a hole of the first hole group 411. A fastener component 430 is shown in a chamfered cylindrical receiving hole of the first hole group 411. The fastener component 430 and the first hole may be considered a seed mate 535. FIG. 5B is a cutaway diagram showing characteristics of the region surrounding the fastener component 430 of the seed mate 535. Table 1 shows a descriptor of the seed mate 535. The measurements are made with respect to an axis 550.

TABLE 1

Descriptor of seed mate of hole group 1 in FIG. 5B

| Faces | Face type | Face Orientation | Distance from axis | Axis Parameter | Radius 1 | Axis Parameter 1 | Radius 2 | Axis Parameter 2 |
|---|---|---|---|---|---|---|---|---|
| AP | Planar | Pointing up | 5.5 | 0.0 | NA | NA | NA | NA |
| AB | Conical | Concave | NA | NA | 5.5 | 0.0 | 3.5 | 2.0 |
| BC | Concave Cylindrical | Concave | NA | NA | 3.5 | 2.0 | 3.5 | 5.5 |
| CQ | Planar | Pointing down | 3.5 | 5.5 | NA | NA | NA | NA |
| DR | Planar | Pointing up | 3.5 | 5.5 | NA | NA | NA | NA |
| DE | Cylindrical | Concave | NA | NA | 3.5 | 5.5 | 3.5 | 15.5 |
| ES | Planar | Pointing down | 3.5 | 15.5 | NA | NA | NA | NA |

Figure 6A:
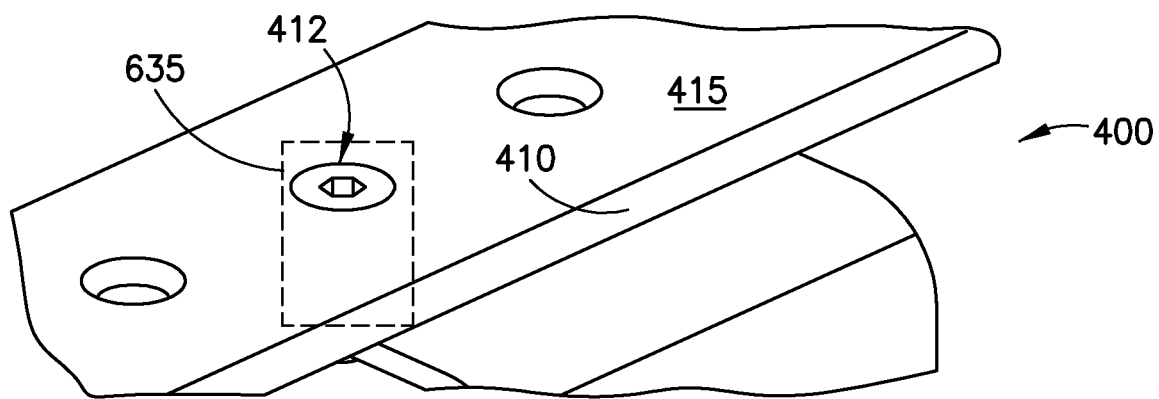
FIG. 6A is a second detail of the assembly of FIG. 4 showing an outline of a hole of the second hole group.
Figure 6B:
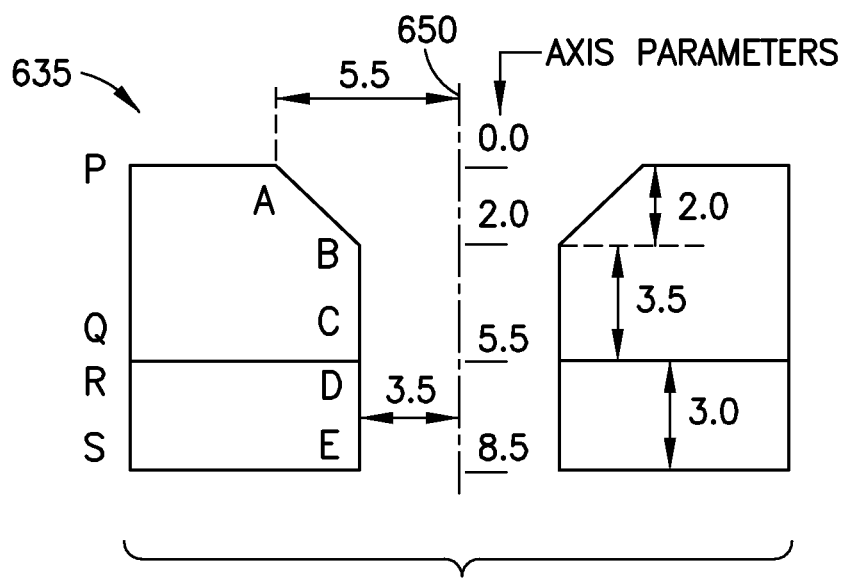
FIG. 6B is a cutaway diagram showing characteristics of the second hole group of FIG. 6A.

FIG. 6A is a second detail of the assembly of FIG. 4 showing an outline of a hole of the second hole group 412. FIG. 6B is a cutaway diagram showing characteristics of the region a second seed mate 635. Table 2 shows a descriptor of the second seed mate 635. The measurements are made with respect to an axis 650.

TABLE 2

Descriptor of seed mate of hole group 2 in FIG. 6B

| Faces | Face type | Face Orientation | Distance from axis | Axis Parameter | Radius 1 | Axis Parameter 1 | Radius 2 | Axis Parameter 2 |
|---|---|---|---|---|---|---|---|---|
| AP | Planar | Pointing up | 5.5 | 0.0 | NA | NA | NA | NA |
| AB | Conical | Concave | NA | NA | 5.5 | 0.0 | 3.5 | 2.0 |
| BC | Cylindrical | Concave | NA | NA | 3.5 | 2.0 | 3.5 | 5.5 |
| CQ | Planar | Pointing down | 3.5 | 5.5 | NA | NA | NA | NA |
| DR | Planar | Pointing up | 3.5 | 5.5 | 3.5 | 5.5 | NA | NA |
| DE | Cylindrical | Concave | NA | NA | 3.5 | 5.5 | 3.5 | 8.5 |
| ES | Planar | Pointing down | 3.5 | 8.5 | NA | NA | NA | NA |

Figure 7A:
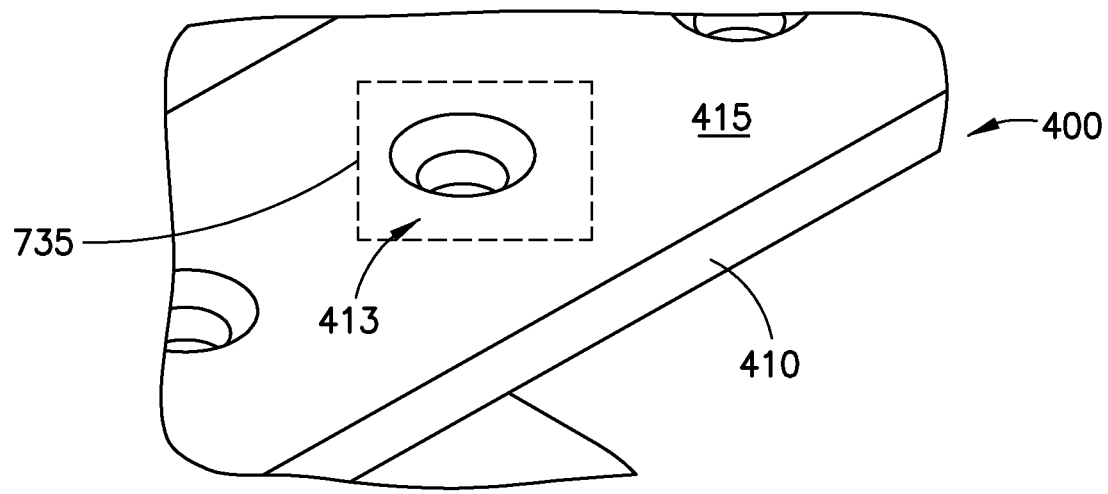
FIG. 7A is a third detail of the assembly of FIG. 4 showing an outline of a hole of the third hole group.
Figure 7B:
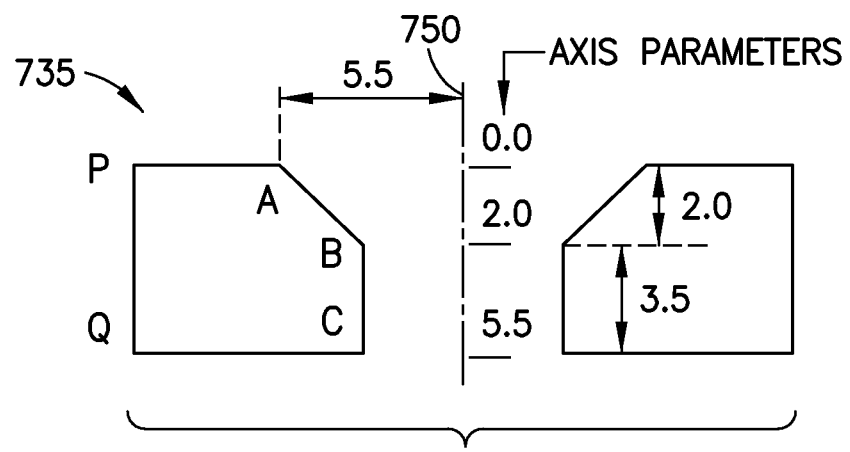
FIG. 7B is a cutaway diagram showing characteristics of the third hole group of FIG. 7A.

FIG. 7A is a third detail of the assembly of FIG. 4 showing an outline of a hole of the third hole group 413. FIG. 7B is a cutaway diagram showing characteristics of the region of a third seed mate 735. Table 3 shows a descriptor of the third seed mate 735. The measurements are made with respect to an axis 750.

TABLE 3

Descriptor of seed mate of hole group 3 in FIG. 7B

| Faces | Face type | Face Orientation | Distance from axis | Axis Parameter | Radius 1 | Axis Parameter 1 | Radius 2 | Axis Parameter 2 |
|---|---|---|---|---|---|---|---|---|
| AP | Planar | Pointing up | 5.5 | 0.0 | NA | NA | NA | NA |
| AB | Conical | Concave | NA | NA | 5.5 | 0.0 | 3.5 | 2.0 |
| BC | Cylindrical | Concave | NA | NA | 3.5 | 2.0 | 3.5 | 5.5 |
| CQ | Planar | Pointing down | 3.5 | 5.5 | NA | NA | NA | NA |

Figure 8A:
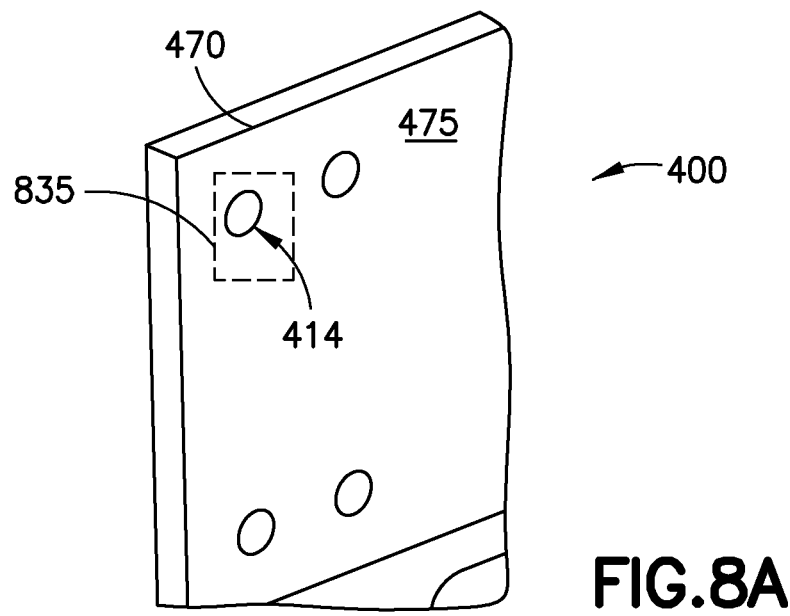
FIG. 8A is a fourth detail of the assembly of FIG. 4 showing an outline of a hole of the fourth hole group.
Figure 8B:
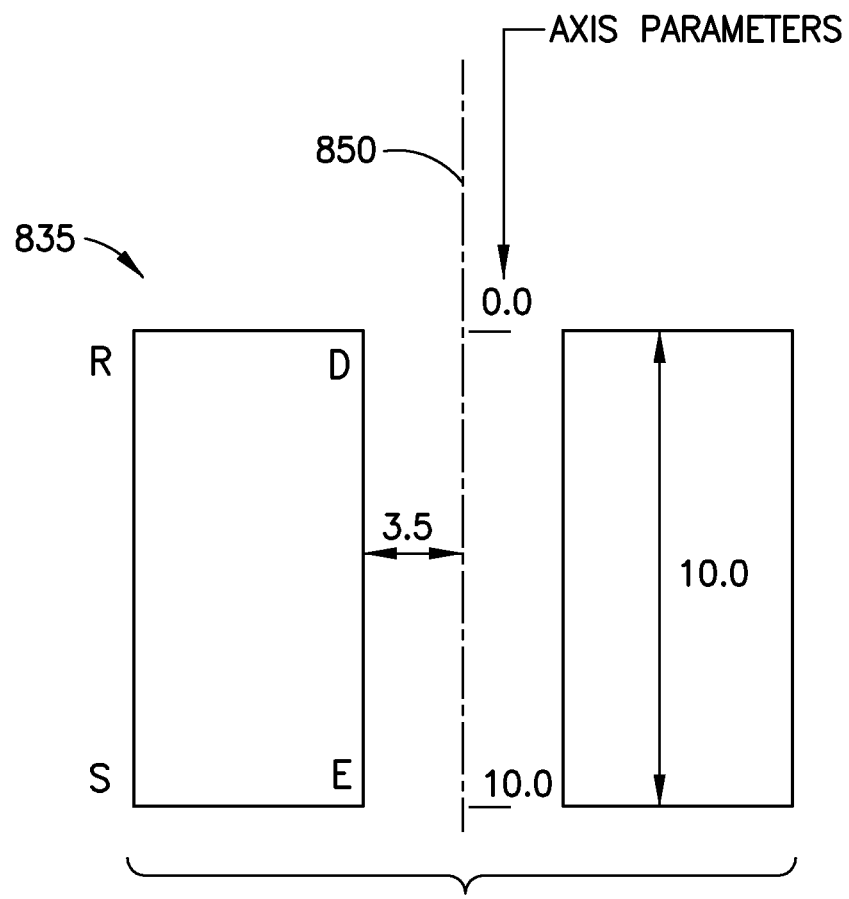
FIG. 8B is a cutaway diagram showing characteristics of the fourth hole group of FIG. 8A.

FIG. 8A is a fourth detail of the assembly of FIG. 4 showing an outline of a hole of the fourth hole group 414. FIG. 8B is a cutaway diagram showing characteristics of the region of a fourth seed mate 835. Table 4 shows a descriptor of the fourth seed mate 835. The measurements are made with respect to an axis 850.

TABLE 4

Descriptor of seed mate of hole group 4 in FIG. 8B

| Faces | Face type | Face Orientation | Distance from axis | Axis Parameter | Radius 1 | Axis Parameter 1 | Radius 2 | Axis Parameter 2 |
|---|---|---|---|---|---|---|---|---|
| DR | Planar | Pointing up | 3.5 | 0.0 | NA | NA | NA | NA |
| DE | Cylindrical | Concave | NA | NA | 3.5 | 0.0 | 3.5 | 0.0 |
| ES | Planar | Pointing down | 3.5 | 10.5 | NA | NA | NA | NA |

Given a fastener component 430 constrained with one hole, under the exemplary embodiments the mate helper examines the descriptors to find and indicate all other holes with matching descriptors as potential targets. The contents of the descriptor may be sorted in the ascending order of the axis parameter. The axis parameter of a given point on an axis is the signed distance of that point from the axis origin. There may be multiple ways to fix the axis origin and the sign convention. Under a convention followed in the example, the axis origin is fixed where the axis parameter is 0.0, at the start of axial geometry. The sign of distance is positive moving inwards from the origin into axial geometry and negative moving outwards.

'Pointing up' and 'Pointing down', mentioned under the 'Face Orientation', column of the descriptor tables are to be considered in the context of the axis parameter. In the given example, the direction along the decreasing axis parameter is considered 'Pointing up' and the direction along the increasing axis parameter is considered 'Pointing down'.

'Distance from axis' denotes the minimum distance of the planar face from the axis. 'Axis Parameter' identifies the unique point on the axis which is nearest to the planar face in question.

'Radius 1' and 'Radius 2' are the start radius and the end radius, respectively, of the axial geometry. If the axial geometry is a cylindrical face, the start radius and the end radius would be equal. If the axial geometry is non-cylindrical (for example, a conical face, then the start radius and the end radius would be different). For more complex axial geometry, for example toroidal faces or revolved faces made with more complex curve profiles, only two data points, start and end radius, may not be enough. For those cases, more data points for the radius variations may be sampled between the start and the end radius and included in the descriptor.

Under alternative embodiments fastener components may include more than one axis. The descriptor, in that case, includes a collection of individual descriptors calculated for each axis. Here, the individual descriptor for each given axis contains additional columns to accommodate the properties of the other axes in the context of the given axis. The properties of the other axes may include the distance of the other axes from the given axis and axis parameter where the minimum distance is achieved.

As described above, the seed mate is defined by a set of descriptors, describing each of the objects directly involved in the mate. For example, the fastener (bolt) is inserted through a hole in a face of a first plate and the fastener attaches to a receiving anchor point on a second plate. In alternative embodiments, there may be a third plate (with a through bore for the fastener) between the first plate and the second plate. Here the mate includes descriptors for the surfaces involved for each of the first, second, and third plates as well as surfaces of the fastener itself. The dimensions of the fastener define the scope what is included in the seed mate descriptors.

Under a second embodiment, after the CAD system has provided a set of suggested mates in the surface of the seed mate, the user may select a hole that was not part of the original suggested mates. This creates a second seed mate, which is added to the search, expanding the search to include holes suitable for the first seed mate and second mate (having matching descriptors) as suggested mates. For example, the first seed mate may be chamfered, while the second seed mate is not. Once all mates have been selected for a first surface, if the user selects a second surface, the scope of the search is expanded to find mates in the second surface.

Under the present embodiments a user may select a hole and the mate helper shows all the holes in the same face having a similar surrounding geometry as potential mates. The user can select additional holes that are either a different diameter or on a non-coplanar face.

If a user selects a combined fastener/receiver as the seed mate, the user is effectively choosing the fastener component and the hole and their associated mates forming the inputs for the revolute mate. For example, assuming the concentric portion of the mate is created between the shank of a bolt and the inner wall of a hole and the coincident portion is created between a planar entity on the bolt, such as the underside of the bolt head and a planar entity on the component that that hole is in such as the face of a plate in which the hole has been created.

Figure 9:
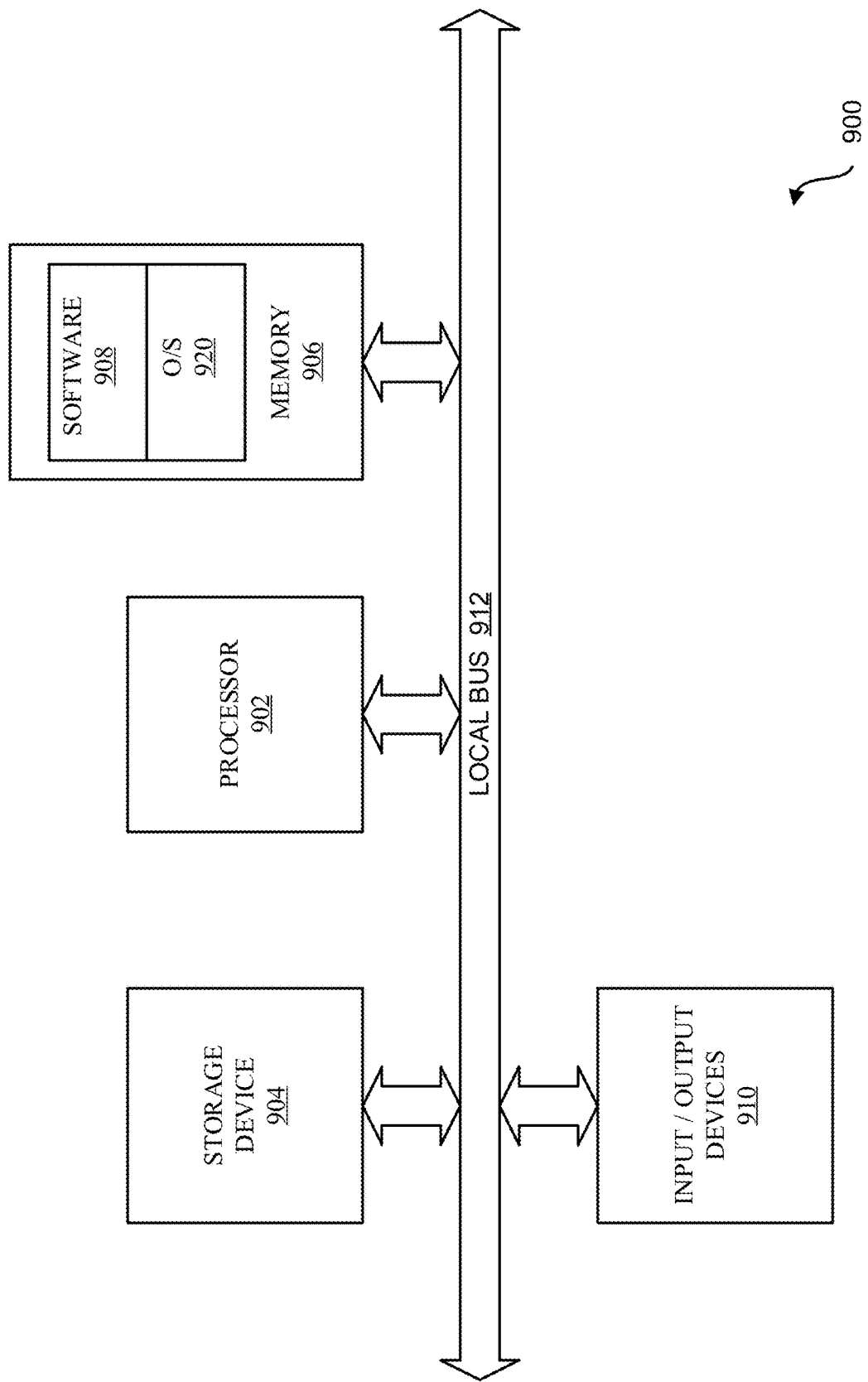
FIG. 9 is a schematic diagram illustrating an example of a system for executing functionality of the present invention.

The present system for executing the functionality described in detail above may be a computer aided drafting application hosted by a computer, an example of which is shown in the schematic diagram of FIG. 9. The system 900 contains a processor 902, a storage device 904, a memory 906 having software 908 stored therein that defines the abovementioned functionality, input, and output (I/O) devices 910 (or peripherals), and a local bus, or local interface 912 allowing for communication within the system 900. The local interface 912 can be, for example but not limited to, one or more buses or other wired or wireless connections, as is known in the art. The local interface 912 may have additional elements, which are omitted for simplicity, such as controllers, buffers (caches), drivers, repeaters, and receivers, to enable communications. Further, the local interface 912 may include address, control, and/or data connections to enable appropriate communications among the aforementioned components.

The processor 902 is a hardware device for executing software, particularly that stored in the memory 906. The processor 902 can be any custom made or commercially available single core or multi-core processor, a central processing unit (CPU), an auxiliary processor among several processors associated with the present system 900, a semiconductor based microprocessor (in the form of a microchip or chip set), a macroprocessor, or generally any device for executing software instructions.

The memory 906 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 906 may incorporate electronic, magnetic, optical, and/or other types of storage media. Note that the memory 906 can have a distributed architecture, where various components are situated remotely from one another, but can be accessed by the processor 902.

The software 908 defines functionality performed by the system 900, in accordance with the present invention. The software 908 in the memory 906 may include one or more separate programs, each of which contains an ordered listing of executable instructions for implementing logical functions of the system 900, as described below. The memory 906 may contain an operating system (O/S) 920. The operating system essentially controls the execution of programs within the system 900 and provides scheduling, input-output control, file and data management, memory management, and communication control and related services.

The I/O devices 910 may include input devices, for example but not limited to, a keyboard, mouse, scanner, microphone, etc. Furthermore, the I/O devices 910 may also include output devices, for example but not limited to, a printer, display, etc. Finally, the I/O devices 910 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 900 is in operation, the processor 902 is configured to execute the software 908 stored within the memory 906, to communicate data to and from the memory 906, and to generally control operations of the system 900 pursuant to the software 908, as explained above.

When the functionality of the system 900 is in operation, the processor 902 is configured to execute the software 908 stored within the memory 906, to communicate data to and from the memory 906, and to generally control operations of the system 900 pursuant to the software 908. The operating system 920 is read by the processor 902, perhaps buffered within the processor 902, and then executed.

When the system 900 is implemented in software 908, it should be noted that instructions for implementing the system 900 can be stored on any computer-readable medium for use by or in connection with any computer-related device, system, or method. Such a computer-readable medium may, in some embodiments, correspond to either or both the memory 906 or the storage device 904. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 902 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 900 is implemented in hardware, the system 900 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the above described embodiments have been directed to mates adjacent to planar, cylindrical, and conical surfaces, in alternative embodiments the mates may include other curved surfaces. Further, while the mating surfaces have been disclosed as holes to receive an inserted fastener, in alternative embodiments the mating surface may have a protruding cylindrical and/or conical portion having at least one central axis that mates with a receiving portion.

While the above embodiments have been directed to product design using CAD software specifically the area of mechanical, electrical, pneumatic, and hydraulic assemblies and multi-body part design, persons having skill in the art will appreciate that alternative embodiments may be directed to other related applications. For example, a video game design embodiment may replicate environmental characteristics in locations that have similar adjacent and regional environmental characteristics. Similarly, HVAC applications may leverage the invention to replicate heating, cooling, or air movement mechanisms at locations where thermal analysis has determined temperature gradients or air flow patterns are of a similar nature, and determine placement of mechanical supports of sizes and orientations to satisfy loading scenarios e.g., structural members in a bridge or building.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method in a computer aided drafting application for replicating a component mating between a first component and a second component in a modeled assembly, comprising the steps of:
   examining constraints and geometry surrounding a selected component of the component mating in a first surface of the assembly;
   capturing a first descriptor comprising a plurality of numerical characteristics of the constraints and geometry;
   setting the first descriptor as a first seed descriptor;
   examining a potential first target geometry in a region of the first face;
   computing a first target descriptor according to the first target geometry;
   comparing the first seed descriptor with the first target descriptor;
   determining the first target descriptor matches the first seed descriptor; and
   creating an instance of a first target component according to the first target descriptor,
   wherein the component mating comprises a combination of a coincident mate forcing two planar faces to be coplanar and a concentric mate forcing two cylindrical or conical faces to be coaxial.

2. The method of claim 1, further comprising the step of highlighting the selected component with a selected component visual indicator and highlighting the first target geometry with a first target visual indicator.

3. The method of claim 2, further comprising the steps of:
   receiving a user deselection of the first target visual indicator; and
   modifying the first target visual indicator to indicate the deselection.

4. The method of claim 3, further comprising the step of removing the instance of the first target component.

5. The method of claim 1, wherein the geometry surrounding a selected component comprises an axis.

6. A computer based method in a computer aided drafting application for replicating a component mating between a first component and a second component in a modeled assembly, comprising the steps of:
   examining constraints and geometry surrounding a selected component of the component mating in a first surface of the assembly;
   capturing a first descriptor comprising a plurality of numerical characteristics of the constraints and geometry;
   setting the first descriptor as a first seed descriptor;
   examining a potential first target geometry in a region of the first face;
   computing a first target descriptor according to the first target geometry;
   comparing the first seed descriptor with the first target descriptor;
   determining the first target descriptor matches the first seed descriptor; and
   creating an instance of a first target component according to the first target descriptor, wherein comparing the seed descriptor with the target descriptor further comprises the step of taking at least one user setting into account.

7. A computer based method in a computer aided drafting application for replicating a component mating between a first component and a second component in a modeled assembly, comprising the steps of:
   examining constraints and geometry surrounding a selected component of the component mating in a first surface of the assembly;
   capturing a first descriptor comprising a plurality of numerical characteristics of the constraints and geometry;
   setting the first descriptor as a first seed descriptor;
   examining a potential first target geometry in a region of the first face;
   computing a first target descriptor according to the first target geometry;
   comparing the first seed descriptor with the first target descriptor;
   determining the first target descriptor matches the first seed descriptor; and creating an instance of a first target component according to the first target descriptor, wherein the user setting further comprises a variance in at least one dimension of the first target descriptor.

8. A computer based method in a computer aided drafting application for replicating a component mating between a first component and a second component in a modeled assembly, comprising the steps of:
   examining constraints and geometry surrounding a selected component of the component mating in a first surface of the assembly;
   capturing a first descriptor comprising a plurality of numerical characteristics of the constraints and geometry;
   setting the first descriptor as a first seed descriptor;
   examining a potential first target geometry in a region of the first face;
   computing a first target descriptor according to the first target geometry;
   comparing the first seed descriptor with the first target descriptor;
   determining the first target descriptor matches the first seed descriptor;
   creating an instance of a first target component according to the first target descriptor;
   receiving a selection of a second seed component in a second surface of the assembly;
   examining second seed constraints and geometry surrounding the second seed component;
   computing a second seed descriptor comprising a plurality of numerical characteristics of the second constraints and geometry;
   comparing the second seed descriptor with the first seed descriptor;
   examining a potential second target geometry in the region of the second seed component and computing a second target descriptor according to the second target geometry;
   comparing the second seed descriptor with the second target descriptor;
   determining the second target descriptor matches the second seed descriptor; and
   creating an instance of the second target component according to the second target descriptor.

9. The method of claim 8, further comprising the step of highlighting the second seed component with the selected component visual indicator and highlighting the second target geometry with a second target visual indicator.

10. The method of claim 8, wherein the second seed component is in a second surface of the assembly.

11. The method of claim 10, wherein the second target component is in the second surface.

12. The method of claim 8, wherein the second target component differs from the first target component in at least one dimension.

* * * * *